(12) United States Patent
Hopson

(10) Patent No.: US 6,582,151 B2
(45) Date of Patent: Jun. 24, 2003

(54) DRIVING AXLE ASSEMBLY

(75) Inventor: Michael Walter Hopson, Clinton Township, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 156 days.

(21) Appl. No.: 09/758,767

(22) Filed: Jan. 11, 2001

(65) Prior Publication Data

US 2002/0090257 A1 Jul. 11, 2002

(51) Int. Cl.[7] .................................................. B25G 3/18
(52) U.S. Cl. ................. 403/359.5; 403/359.6; 464/182
(58) Field of Search .................... 403/359.1, 359.5, 403/359.6, 315–318, 345, 353, 355, 357; 464/182

(56) References Cited

U.S. PATENT DOCUMENTS

| | | | | |
|---|---|---|---|---|
| 1,631,236 A | * | 6/1927 | Werner | 180/384 |
| 4,136,982 A | * | 1/1979 | Sagady | 403/108 |
| 4,225,263 A | * | 9/1980 | Asberg | 403/326 |
| 4,261,668 A | * | 4/1981 | Rigal | 403/319 |
| 5,492,417 A | | 2/1996 | Baker et al. | |
| 5,499,884 A | * | 3/1996 | Kuhnhold et al. | 403/326 |
| 5,611,733 A | * | 3/1997 | Jacob et al. | 464/140 |
| 5,643,092 A | * | 7/1997 | Girguis | 403/359.5 |
| 5,667,332 A | * | 9/1997 | Lindholm | 403/326 |
| 5,853,250 A | | 12/1998 | Krude et al. | |
| 5,957,615 A | * | 9/1999 | Orain | 403/298 |

* cited by examiner

*Primary Examiner*—James R. Brittain
(74) *Attorney, Agent, or Firm*—John E. Kajander, Esq.

(57) ABSTRACT

An attachment system, which couples an inboard constant velocity joint to a mating component, is disclosed. The system includes a stub shaft having an end portion and a first connector integrally formed with the end portion. The first connector includes a polygon-shaped cross-section and a first groove formed therein. A circlip is located in the first groove at the first connector. The system further includes a second connector, which engages the first connector and includes a sleeve which is sized to receive the first connector. The second connector is integrally formed within the mating component. The second connector also has a second groove formed therein which receives the circlip.

17 Claims, 2 Drawing Sheets

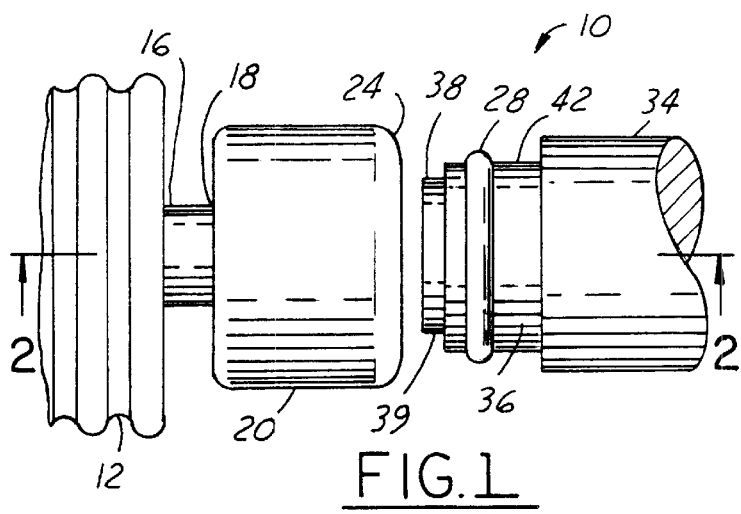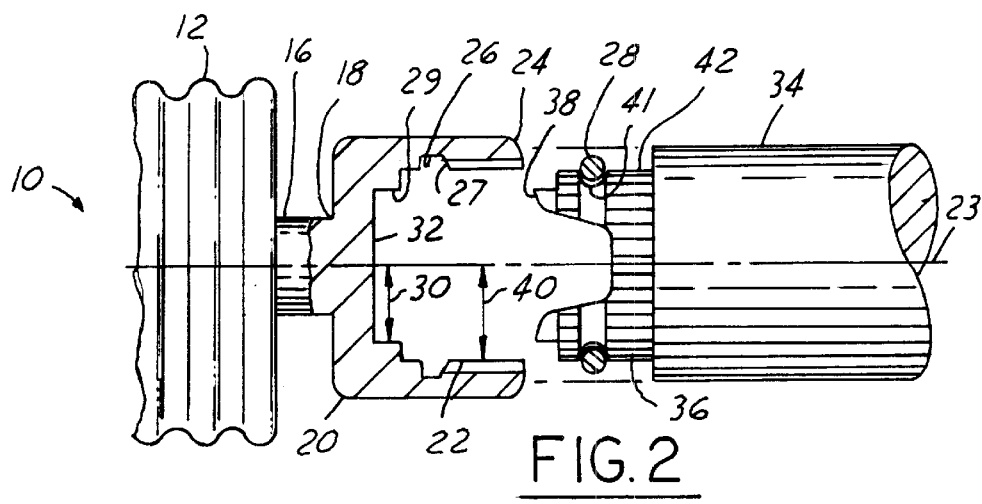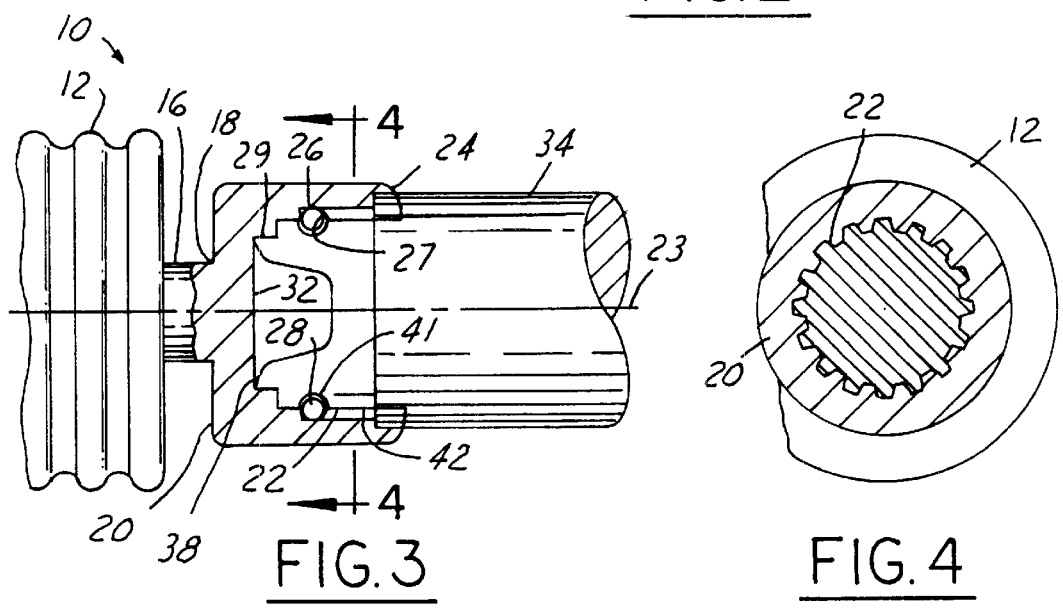

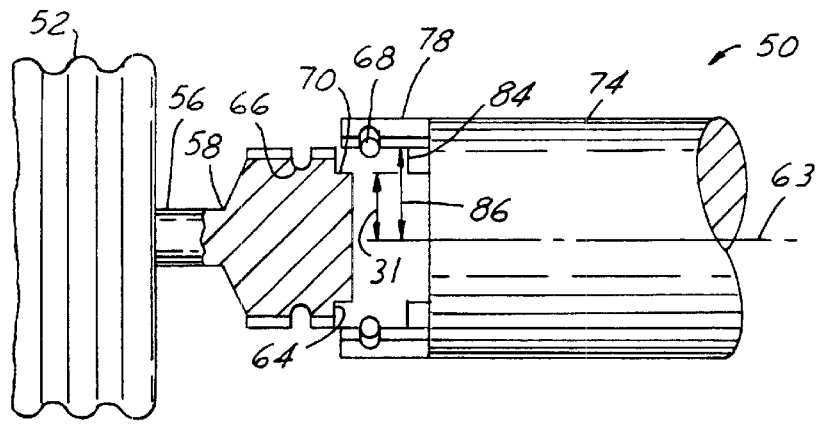
FIG.5
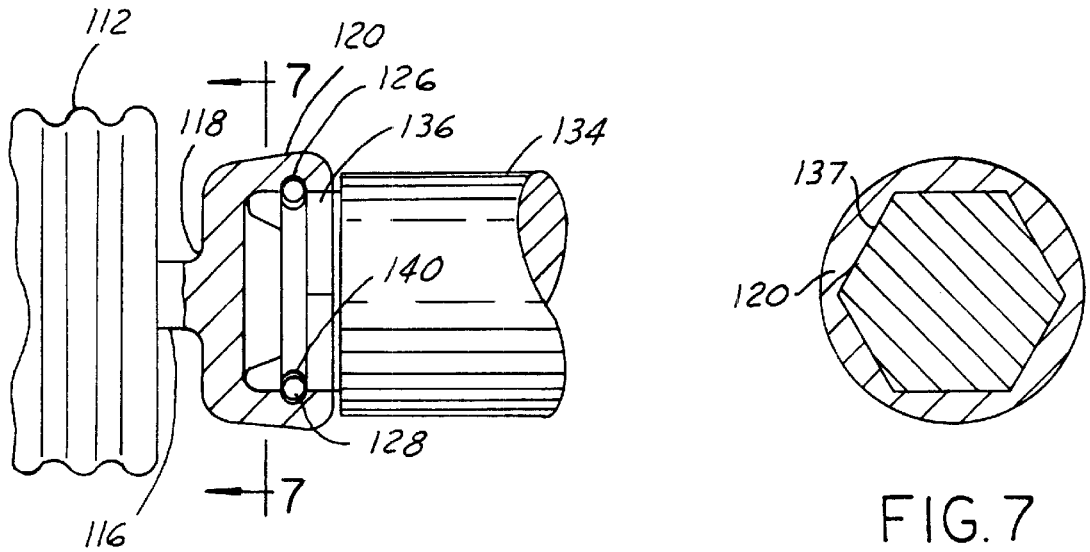
FIG.6
FIG.7
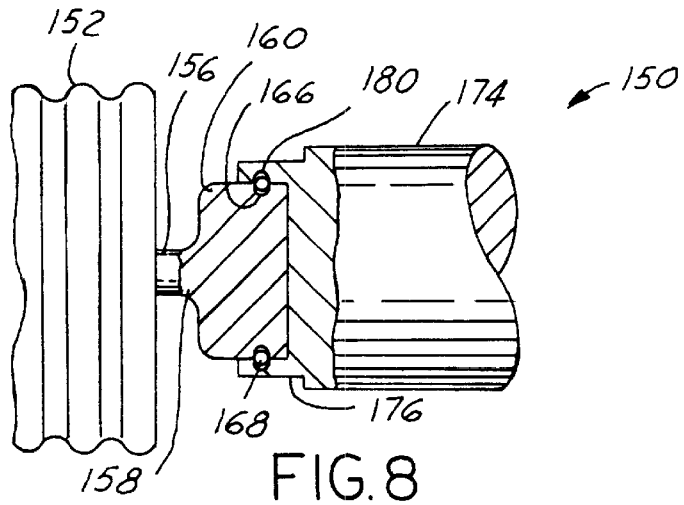
FIG.8

DRIVING AXLE ASSEMBLY

TECHNICAL FIELD

The present invention relates generally to driving axles, and more particularly concerns a system for attaching an inboard constant velocity (CV) joint of a driving axle to its mating component so as to facilitate assembly of the driving axle while maintaining torque transmission, concentricity, and serviceability.

BACKGROUND OF THE INVENTION

It is well known that speed variation problems can be solved by using two universal joints in series. If the joints are properly arranged, the irregularity introduced by one joint will be cancelled out by the equal and opposite irregularity introduced by the second joint. Constant velocity joints include such double universal joints as well as any joint in which the speeds of the shafts connected by the joint are absolutely equal at every instant throughout each revolution. Characteristically, a constant velocity joint includes a shaft with a universal-type coupling at each end. This arrangement is sometimes referred to as a constant velocity shaft Driving axles are widely used in the automotive industry. Typically, driving axles employ inboard CV joints, an interconnecting shaft, and an outboard CV joint in order to transmit torque from a final drive unit to the driving wheels. These CV joints are used to transmit torque at varying angles caused by vertical movement of the wheels and engine movement resulting from torque reaction. In a front wheel drive vehicle, constant velocity driveshafts are used in pairs. One shaft is located on the left (driver) side of the vehicle and the other is placed on the right (passenger) side. Each shaft has an inboard or plunge coupling that connects the constant velocity shaft to the engine/transaxle and an outboard or fixed coupling that connects the shaft to a left or right wheel. The inboard and outboard couplings and shaft together comprise a constant velocity joint or driveshaft which couples the engine/transaxle shaft to the wheel shaft. In operation, the outboard coupling turns with the wheel around a "fixed" center, while the inboard coupling "telescopes" or plunges and turns at an angle sufficient to allow required movement of the automobile suspension system.

Constant velocity joints are also currently used in the drive trains of automotive vehicles. In such vehicles, one universal joint connects a propeller shaft to a rotary output of the transmission while a second universal joint connects the propeller shaft to a wheel. As the vehicle travels over an uneven surface or leans to one side or the other during turns, the wheels move up and down in a plane, approximately normal to the propeller shaft. Therefore, provisions are made in such joints to accommodate for the changes in the distance between the wheel and the transmission as the wheel moves up and down or the engine or transmission vibrates under high loads.

Currently there are three primary systems for attaching an inboard CV joint to its mating component. The first system involves plugging a CV joint into a mating component by aligning splines and sliding the splines together. The connection is secured by a standard circlip. The second system is similar to the first system with the exception that the mating component is plugged into the CV joint. The third system is also similar to the first and second systems except that the CV joint is bolted to the mating component rather than secured by a circlip.

Usually, on a CV joint, a rubberized boot extends axially from the open end of the housing and projects over the driveshaft. Grease is retained within the boot, and lubricates the connection between the driveshaft and the constant velocity joint. The connection is subjected to diverse stresses and strains, and effective lubrication is essential to the proper functioning of the constant velocity joint. The boot, because of its exposed location on an automobile, may be punctured, may be attacked by climatic and road conditions, or may simply wear out after extended use. At such time, as a minimum, the boot must be replaced, and, in many instances, the joint must be repaired. In order to effectuate the necessary replacement and/or repair, the driveshaft and the constant velocity joint must be disassembled.

The current systems for assembling CV joints and mating components are relatively inefficient because time is wasted aligning and securing CV joints and mating components. Also, current systems for disassembling CV joints and mating components are inefficient because often CV joints are not designed for disassembly and, resultantly, many CV joints must be destroyed during separation.

The disadvantages associated with these conventional CV joint assembly and disassembly techniques have made it apparent that a new system for CV joint construction is needed. This new system should have a guiding system to facilitate alignment of the joint and the mating component. Design of this new system should also involve creating CV joints that are easily disassembled from their respective mating components.

SUMMARY OF THE INVENTION

It is an object of the present invention to provide an improved attachment system. It is also an object of the present invention to provide an improved attachment system for applications, which include inboard constant velocity joints.

In accordance with the present invention, an attachment system, which couples an inboard constant velocity joint to a mating component, is disclosed. The system includes a stub shaft having an end portion and a first connector integrally formed with the end portion. The first connector includes a polygon-shaped cross-section and a first groove formed therein. A circlip is located in the first groove at the first connector. The system further includes a second connector, which engages the first connector and includes a sleeve which is sized to receive the first connector. The second connector is integrally formed within the mating component. The second connector also has a second groove formed therein which receives the circlip.

Additional objects and features of the present invention will become apparent upon review of the drawings and accompanying detailed description of the preferred embodiments.

BRIEF DESCRIPTION OF THE DRAWINGS

FIG. 1 is a perspective view of an attachment system for an inboard constant velocity joint and a mating component in accordance with one embodiment of the present invention;

FIG. 1A is side view of the circlip, illustrated in FIG. 1, in accordance with one embodiment of the present invention;

FIG. 2 is a partial sectional view of FIG. 1 along line 2—2;

FIG. 3 is a partial sectional view of the assembled attachment system for an inboard constant velocity joint illustrated in FIG. 2, in accordance with one embodiment of the present invention;

FIG. 4 is a sectional view of FIG. 3 along line 4—4;

FIG. 5 is a partial sectional view of an inboard constant velocity joint and a mating component in accordance with another embodiment of the present invention;

FIG. 6 is a partial sectional view of an inboard constant velocity joint and a mating component in accordance with another embodiment of the present invention;

FIG. 7 is a sectional view of FIG. 6 along line 7—7;

FIG. 8 is a partial sectional view of an inboard constant velocity joint and a mating component in accordance with another embodiment of the present invention.

DETAILED DESCRIPTION OF THE PREFERRED EMBODIMENTS

The present invention is illustrated with respect to an attachment system 10, particularly suited to the automotive field. However, the present invention is applicable to various other uses that may require robust attachment systems, as will be understood by one skilled in the art.

Referring to FIGS. 1, 1A, 2, 3, and 4, an attachment system 10 for an inboard constant velocity joint and a mating component, in accordance with one embodiment of the present invention, is illustrated. FIG. 1 illustrates a perspective view of the attachment system 10. FIG. 2 further illustrates the attachment system 10, illustrated in FIG. 1, along line 2—2. The attachment system 10 includes a typical inboard constant velocity joint (CV joint) 12. The CV joint 12 includes a stub shaft 16 that is integrally formed with the CV joint 12, as will be understood by one skilled in the art. The stub shaft 16 has an end portion 18 with a first connector 20 integrally formed with the end portion 18. The first connector 20 has a first set of splines 22, which line the internal circumference of the first connector 20 from the edge portion 24 of the first connector 20 to a first groove 26 in the first connector 20.

The first set of splines 22 protrude inward toward the central longitudinal axis 23 of the CV joint 12. The first groove 26 is sized to receive a circlip 28 when the attachment system 10 is actuated, illustrated in FIG. 3, as will be discussed later. The first set of splines 22 are further illustrated in the cross-sectional view of FIG. 3, along line 4—4, illustrated in FIG. 4.

The first groove 26 ideally has a ramp portion 27, which angles away from the end portion 18. The ramp portion 27 facilitates disassembly of the attachment system 10, which will be discussed later.

The circlip 28, in the current embodiment, has an integrated tab design to simplify separation of components of the attachment system 10. In FIG. 1A, a circlip 28, with two tabs 31, is illustrated. However, alternate designs and numbers of tabs will be evident to one skilled in the art. The tabs 31 extend substantially outward from the circlip 28 from the end portions of the circlip 28. The circlip should be somewhat flexible such that when the tabs 31 are pressed substantially together, the diameter of the circlip 28 is partially collapsed to facilitate disassembly of the attachment system 10, which will be discussed later.

A first pilot diameter section 29 with a first pilot diameter 30 forms substantially between the internal wall 32 of the first connector 20 and the first groove 26. The first pilot diameter 30 embodied here is measurably less than the internal diameter of the first connector 20. This first pilot diameter section 29 simplifies assembly for the attachment system 10, which will be discussed later.

The attachment system 10 further includes a mating component 34, such as an axle, transmission, or driveshaft, integrally formed with a second connector 36. The second connector 36 has an edge portion 38 with a second pilot diameter section 39, which has a second pilot diameter 40, sized to couple with the first pilot diameter section 29. A second groove 41 circumvents the external circumference of the second connector 36 between the edge portion 38 and the mating component 34. The second groove 41 is sized to receive the circlip 28 during engagement of the attachment system 10. Though a ramp portion like 27 is not included as part of the second groove 41, one may alternately be added as necessary to simplify manufacturing. A second set of splines 42, sized to couple with the first set of splines 22, overlay the circumference of the second connector 38 between the second groove 41 and the mating component 34.

Referring to FIG. 5, a partial sectional view of an attachment system 50, in accordance with another embodiment of the present invention, is illustrated. The attachment system 50 includes a typical inboard constant velocity joint 52. The CV joint 52 includes a stub shaft 56 that is integrally formed with the CV joint 52, as will be understood by one skilled in the art. The stub shaft 56 has an end portion 58 with a first connector 60 integrally formed with the end portion 58. The first connector 60 has a first set of splines 62, which line the external circumference of the first connector 60 from the edge portion 64 of the first connector 60 to a first groove 66 in the first connector 60. The first groove 66 is sized to receive a circlip 68 when the attachment system 50 is actuated, as will be discussed later. The first set of splines 62, in this embodiment, continue from the first groove 66 to the side of the first connector 60 opposite the stub shaft 56. The first set of splines 62 protrude outward from the central longitudinal axis 63 of the CV joint 52. A first pilot diameter section 70, with a first pilot diameter 71, extends from the side of the first connector 60 opposite the stub shaft 56. Ideally, the first pilot diameter section 70 is centered on the central longitudinal axis 63 of the CV joint 52. The first pilot diameter 71 embodied here is measurably less than the diameter of the first connector 60. This first pilot diameter section 70 simplifies assembly for the attachment system 50, as will be discussed later.

The attachment system 50 further includes a mating component 74, integrally formed with a second connector 76. The second connector 76, embodied here, acts as a cylindrical sleeve for the first connector 60. The second connector 76 has a second set of splines 82, sized to couple with the first set of splines 62, which circumvent the internal circumference of the second connector 78, centered on the central longitudinal axis 63 of the CV joint 52. A second groove 80 circumvents the internal circumference of the second connector 76 and is positioned and sized to receive the circlip 68 during engagement of the attachment system 50, which will be discussed later. A second pilot diameter section 84, which has a second pilot diameter 86, protrudes from the mating component 74 and is sized to couple with the first pilot diameter section 70 during attachment of the components, which will be discussed later. The second pilot diameter section 84 is substantially centered on the central longitudinal axis 63 of the CV joint 52 and is surrounded by the internal circumference of the second connector 76.

Referring to FIG. 6 and FIG. 7, a partial sectional view of an attachment system 100, in accordance with another embodiment of the present invention, is illustrated. The attachment system 100 includes a typical inboard constant velocity joint 112. The CV joint 112 includes a stub shaft 116 that is integrally formed with the CV joint 112, as will be understood by one skilled in the art. The stub shaft 116 has an end portion 118 with a first connector 120 integrally formed with the end portion 118. The first connector 120 also has an internal polygon cross-section, which substantially simplifies assembly of the attachment system 100, as will be discussed later. A first groove 126 circumvents the internal circumference of the first connector 120. The first groove 126 is sized to receive a circlip 128 when the attachment system 100 is actuated, as will be discussed later.

The attachment system 100 further includes a mating component 134, integrally formed with a second connector 136. The second connector 136 has an external polygon cross-section, which is sized to couple with the internal polygon cross-section 137 of the first connector 120. The internal polygon cross-section 137 is further illustrated in the sectional view of FIG. 3, along line 4—4, illustrated in FIG. 7. A second groove 140 circumvents the external polygon circumference of the second connector 136. The second groove 140 is sized and positioned to receive the circlip 128 during engagement of the attachment system 100, which will be discussed later.

Referring to FIG. 8, a partial sectional view of an attachment system 150, in accordance with another embodiment of the present invention, is illustrated. The attachment system 150 includes a typical inboard constant velocity joint 152. The CV joint 152 includes a stub shaft 156 that is integrally formed with the CV joint 152, as will be understood by one skilled in the art. The stub shaft 156 has an end portion 158 with a first connector 160 integrally formed with the end portion 158. The first connector 160 also has an internal polygon cross-section 137, which substantially simplifies assembly of the attachment system 150, as will be discussed later. A first groove 166 circumvents the internal circumference of the first connector 160. The first groove 166 is sized to receive a circlip 168 when the attachment system 150 is actuated, as will be discussed later.

The attachment system 150 further includes a mating component 174, integrally formed with a second connector 176. The second connector 176, embodied here, acts as a cylindrical sleeve for the first connector 160. The second connector 176 has an external polygon cross-section, which is sized to couple with the internal polygon cross-section 177 of the first connector 160. A second groove 180 circumvents the internal polygon circumference of the second connector 176. The second groove 180 is sized and positioned to receive the circlip 168 during engagement of the attachment system 150, which will be discussed later.

In operation, using the embodiment in FIG. 1 and FIG. 2 to illustrate, the first connector 20 is coupled to the second connector 38 by sliding the first connector 20 over the second connector 38, as will be understood by one skilled in the art. The embodiment illustrated in FIG. 2 has two sets of splines 22, 42. The splines 22, 42 maintain concentricity during assembly and guide the connectors 20, 36 together. The fully assembled attachment system 10 from FIG. 1 and FIG. 2 is illustrated in FIG. 3. When assembling the connectors 20, 38, the splines 22, 42 must align. Therefore, the pilot diameters 30, 40 guide the connectors 20, 36 together and maintain a sufficient amount of concentricity while the splines 22, 42 are aligning. Additionally, the designs of the first connector 20 and the second connector 36 facilitate maintenance of torque transmission. In other words, when connected, the connectors 20, 36 maintain a substantially constant torque between them.

The connectors 20, 36 decouple by first implementing a retention device. In other words, the tabs 31 are pressed together to partially collapse the circlip 28. This releases tension between the first connector 20 and the second connector 36, as will be understood by one skilled in the art. Next, the CV joint 12 slidibly removes from the mating component 34. During this step, the circlip 28 slides over the ramp portion 27 of the first groove 26. A typical connector for a CV joint has grooves with relatively steep sides that require greater effort over which to move. The ramp portion 27 reduces effort necessary for disassembly. Subsequently, the concentricity controller (here the splines 22, 42) is disengaged and the attachment system 10 is disassembled.

The embodiment illustrated in FIG. 4, alternately, has connectors 120, 136 with polygon cross-sections for achieving the same concentricity control. However, the polygon cross-section design does not require a separate set of pilot diameters as does the spline design in FIG. 1 because the polygon connectors 120, 136 are relatively simple to align.

While the invention has been described in connection with one or more embodiments, it should be understood that the invention is not limited to those embodiments. On the contrary, the invention covers all alternatives, modifications, and equivalents, as may be included within the spirit and scope of the appended claims.

What is claimed is:

1. A system for attaching an inboard constant velocity joint to a mating component, the system comprising:
    a stub shaft having an end portion;
    a first connector integrally formed with said end portion of said stub shaft, said first connector having a polygon-shaped cross-section and a first groove formed therein;
    a circlip located in said first groove of said first connector and wherein said circlip includes a set of tabs that press together to create a collapsible diameter for said circlip; and
    a second connector engaging said first connector, said second connector comprising a sleeve sized to receive said first connector, said second connector integrally formed within the mating component; said second connector having a second groove formed therein for receiving said circlip.

2. The system of claim 1 wherein said polygon cross-sectional area of said first connector is sized to be greater than a cross-sectional area of said stub shaft.

3. The system of claim 1 wherein said first groove includes a ramp which facilitates disassembly.

4. The system of claim 1 wherein said second groove includes a ramp which facilitates disassembly.

5. The system of claim 1 wherein the mating component is a transmission.

6. The system of claim 1 wherein the mating component is an axle.

7. The system of claim 1 wherein the mating component is a driveshaft.

8. The system of claim 1 wherein torque transmission is substantially constant between said first connector and said second connector.

9. A system for attaching an inboard constant velocity joint to a mating component, said system comprising:
    a stub shaft having an end portion;
    a first connector integrally formed within said end portion of said stub shaft, said first connector having a first set of splines and a first pilot diameter;
    a circlip located in a first groove formed in said first connector and wherein said circlip includes a set of tabs that press together to create a collapsible diameter for said circlip; and
    a second connector sized to engage said first connector, said second connector having a second set of splines and a second pilot diameter, said second connector integrally formed within the mating component; said second connector having a second groove formed therein subject to receive said circlip.

10. The system of claim 9 wherein said first groove includes a ramp which facilitates disassembly.

11. The system of claim 9 wherein said second groove includes a ramp which facilitates disassembly.

12. The system of claim 9 wherein the mating component is a transmission.

13. The system of claim 9 wherein the mating component is an axle.

14. The system of claim 9 wherein the mating component is a driveshaft.

15. The system of claim 9 wherein torque transmission is substantially constant between said first connector and said second connector.

16. The system of claim 9 wherein said first connector further comprises a cylindrical sleeve subject to receive said second connector, said first connector having first splines projecting inwardly from an inner surface of said sleeve.

17. The system of claim 9 wherein said second connector further comprises a cylindrical end portion with said second splines projecting radially outward therefrom along an longitudinal axis of said cylindrical end portion.

* * * * *